Figures 1, 2:
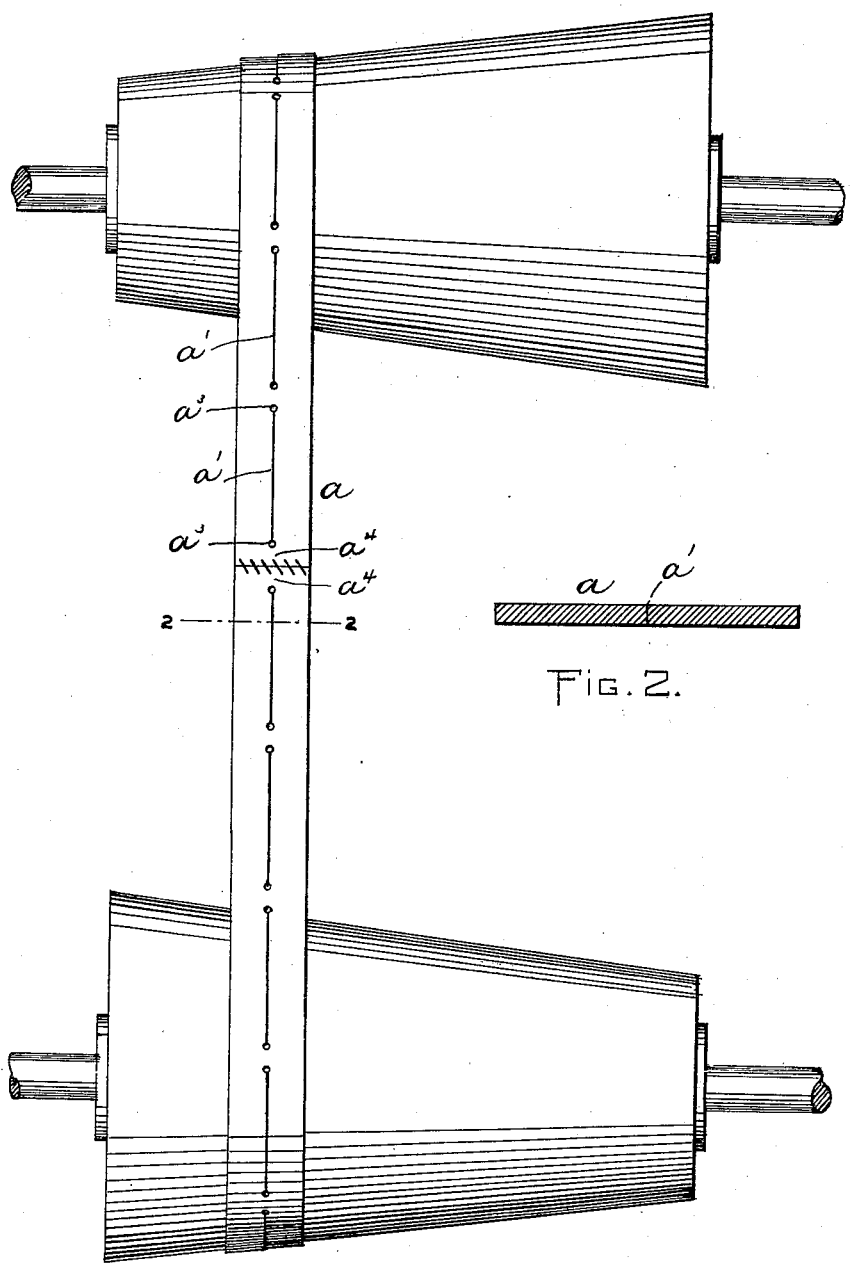

No. 627,810. Patented June 27, 1899.
G. B. ROWBOTHAM.
DRIVING BELT.
(Application filed July 5, 1898.)
(No Model.)

Witnesses
E. Batchelder
R. M. Pierson

Inventor
Geo. B. Rowbotham
by Wright, Brown & Quinby
attys.

UNITED STATES PATENT OFFICE.

GEORGE B. ROWBOTHAM, OF BOSTON, MASSACHUSETTS.

DRIVING-BELT.

SPECIFICATION forming part of Letters Patent No. 627,810, dated June 27, 1899.

Application filed July 5, 1898. Serial No. 685,093. (No model.)

*To all whom it may concern:*

Be it known that I, GEORGE B. ROWBOTHAM, of Boston, in the county of Suffolk and State of Massachusetts, have invented certain new and useful Improvements in Driving-Belts, of which the following is a specification.

This invention relates to driving-belts intended particularly to be used on cone-pulleys or on pulleys whose axes are substantially at right angles with each other, giving the belt a quarter-turn.

My improved belt is longitudinally subdivided, so that it will automatically adapt itself to the conditions required when cone-pulleys or pulleys arranged with their axes extending in different directions are employed.

My invention consists in a driving-belt comprising a strip having a series of longitudinal slits partially subdividing the belt lengthwise between its edges, each of said slits being separated by uncut portions of the strip which connect the subdivisions of the belt and keep them properly related to each other, at the same time permitting the belt to adapt itself to the conditions above indicated.

Of the accompanying drawings, forming a part of this specification, Figure 1 represents my improved belt mounted upon two conical pulleys. Fig. 2 represents a section on line 2 2 of Fig. 1.

The same letters of reference indicate the same parts in both figures.

In the drawings, $a$ represents a strip of belting material, which may be leather or any other suitable material or combination of materials.

$a'$ $a'$ represent a series of slits extending lengthwise through the belt between its edges, the slits being arranged end to end and formed by cutting through the belt, preferably without removing any of its material excepting at the ends of the slits, which, if desired, may be formed by punching out small pieces of the belt to form orifices $a^3$ $a^3$, each slit $a'$ extending from one orifice to another. I do not limit myself, however, to this method of forming the ends of the slits, as the orifices $a^3$ may be dispensed with, if desired. Each slit is separated from the next by an uncut portion $a^2$ of the belt strip, said portions $a^2$ connecting the subdivisions of the belt formed by the act of cutting the slits $a'$. The strip is preferably provided with end portions $a^4$, which are uncut or solid and extend continuously across the strip, these end portions permitting the ends of the strip to be securely united by means of lacings or other suitable fastenings.

It will be seen that by forming a series of slits extending lengthwise through the belt and separated by solid or uncut portions of the belt I partially subdivide the belt longitudinally, and thereby increase its flexibility in such manner that it is enabled to readily conform to the surfaces of two cone-pulleys upon which it runs and to the surfaces of two pulleys arranged with their axes at right angles with each other. It is well known that ordinary belts running on either of the above-mentioned arrangements of pulleys do not bear uniformly across their entire width on the peripheries of the pulleys, one edge of the belt having a bearing, while the other edge stands out from the pulley. It has been proposed to remedy this difficulty by constructing a belt of a series of independent strips coupled together by links, as shown in Patent No. 467,765, the links being riveted to the strips of the belt. My improvement, however, obviates the necessity of assembling a number of parts and requires but a single piece or strip, as in the ordinary belt. The ends of the strip may be united by any usual or suitable means.

The described improvement also enables the belt to conform more accurately to the periphery of a crown-pulley, the edges of the belt bearing closely on the pulley at opposite sides of its highest portion.

I claim—

1. A driving-belt comprising a strip having a series of longitudinal slits partially subdividing the belt lengthwise between its edges, said slits being separated by uncut portions of the strip which connect the subdivisions of the belt.

2. A driving-belt comprising a strip having longitudinal slits in its body portion, and end portions which are solid or continuous across the strip, the slits being separated by uncut portions of the strip.

In testimony whereof I have affixed my signature in presence of two witnesses.

GEORGE B. ROWBOTHAM.

Witnesses:
C. F. BROWN,
E. BATCHELDER.